Nov. 7, 1933.  M. C. FRENCH  1,933,973
MOTOR CAR STABILIZER AND SAFETY BRAKE
Filed Nov. 8, 1932   2 Sheets-Sheet 1
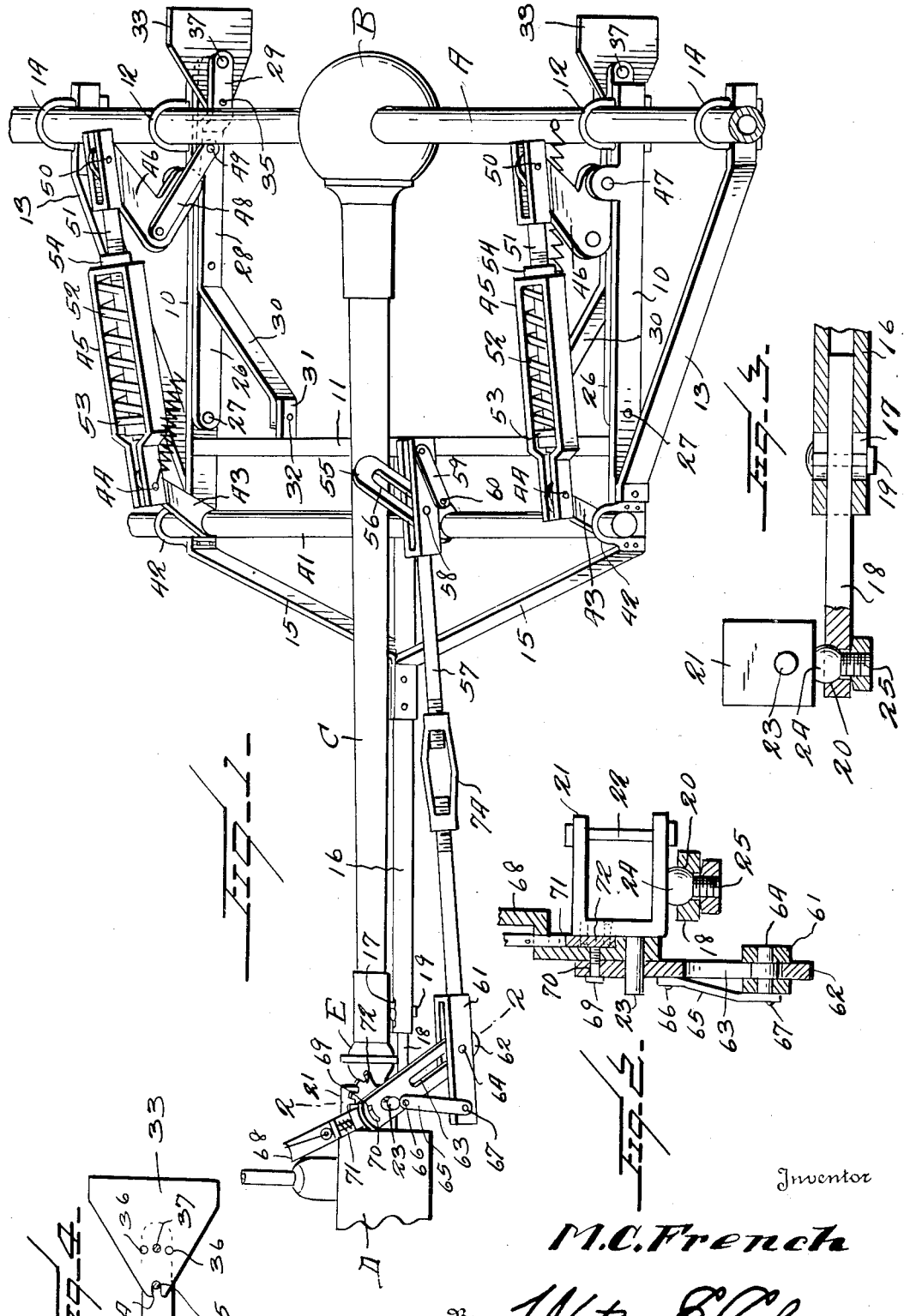
Inventor
M. C. French
By Watson E. Coleman
Attorney

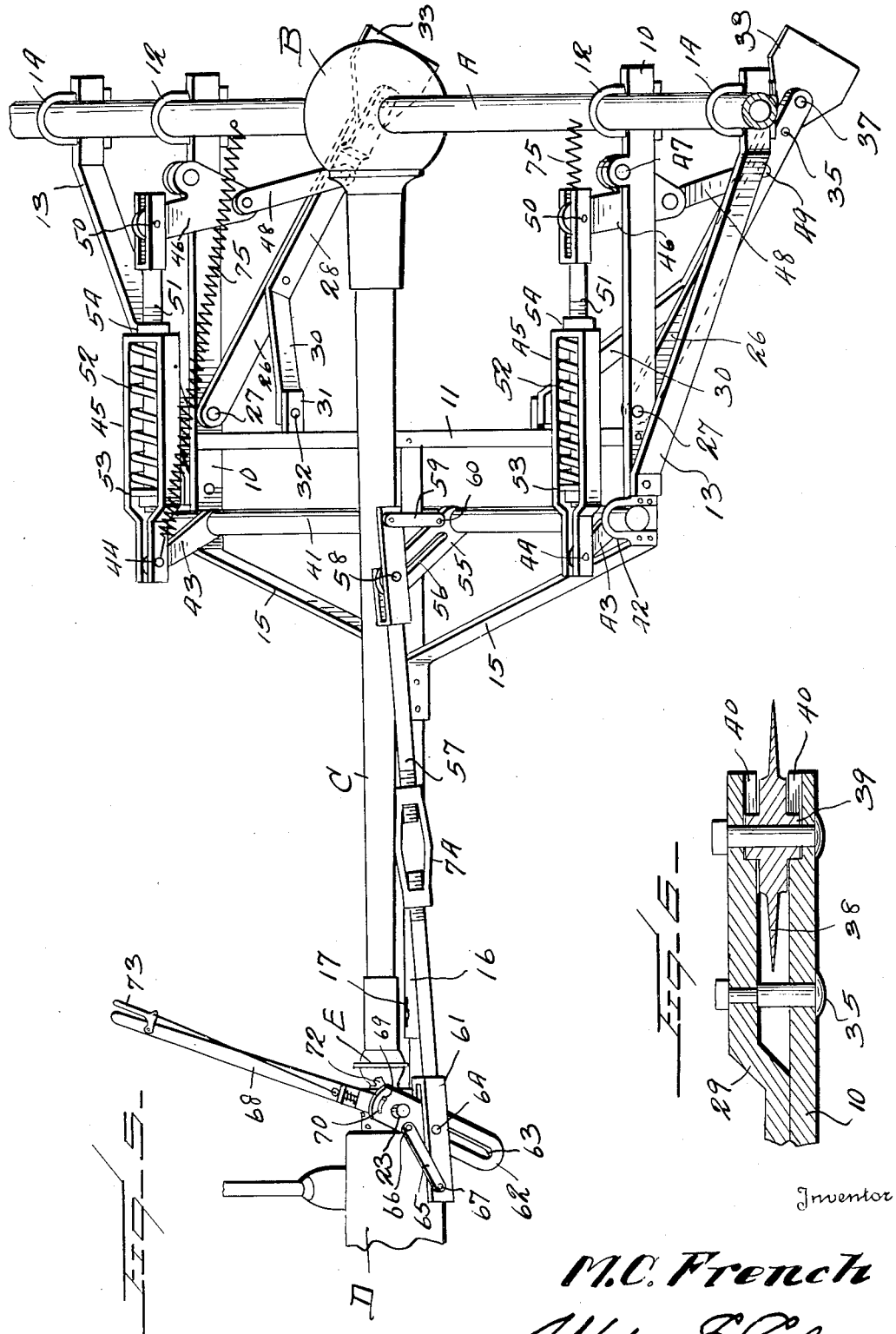

Patented Nov. 7, 1933

1,933,973

UNITED STATES PATENT OFFICE 1,933,973

MOTOR CAR STABILIZER AND SAFETY BRAKE

Morgan C. French, Englewood, Colo.

Application November 8, 1932. Serial No. 641,766

12 Claims. (Cl. 188—5)

This invention relates to attachments for automobiles and particularly to an attachment designed to eliminate side skidding and crawling of the rear end of a motor.

The general object of the invention is to provide elements at the rear end of a motor car which may be depressed into contact with the road and which will prevent any sidewise movement of the rear end of the car, such as is liable to occur on slippery or muddy roads and which may also be used to act as a brake.

A further object is to provide improved means whereby these ground engaging elements may be forced down against the road bed or into the road to thus hold the rear end of the car from lateral movement or skidding, the construction being such that it takes up a relatively small amount of space, that it does not project unduly below the body of the car and that it has relatively speaking few parts.

A further object is to provide means for operating these anti-skidding elements so constructed that the elements may be quickly and powerfully depressed without undue exertion on the part of the operator.

A further object is to provide a device of this character which may be used in going up a hill to hold the car from running back if for any reason the car should have to stop on the hill and to provide devices which when lowered may strike a rock or obstruction without damage and which automatically adjusts itself to the surface of the road whether one side of the road is high and the other low or not.

Other objects will appear in the course of the following description.

My invention is illustrated in the accompanying drawings, wherein:—

Figure 1 is a perspective view of my attachment with the anti-skid or brake elements raised;

Figure 2 is a section on the line 2—2 of Figure 1;

Figure 3 is a longitudinal sectional view of the forward end of the tongue;

Figure 4 is a side elevation of the member 33 with one side of the fork broken away;

Figure 5 is a perspective view like Figure 1 but with the anti-skid elements depressed;

Figure 6 is a sectional view through the forked ends of one of the arms showing the anti-skid element in the form of a sharp edged wheel.

Referring particularly to Figures 1 and 5, A designates the transversely extending rear axle housing, B the differential housing, C the shaft housing leading from the differential housing to the engine, D the transmission casing and E the usual universal joint between the shaft housing C and the transmission case D.

All these parts may be of any usual or suitable construction and form no part of my invention except insofar as my mechanism is mounted on certain of these parts. My mechanism is supported by a frame comprising the lateral members 10 connected by a transverse brace 11 at their forward ends and at their rear ends having means 12 whereby these longitudinally extending beams 10 may be clamped upon the rear axle housing A. Lateral braces 13 extend from the forward ends of the beams 10 to the ends of the rear axle housing, these braces being provided with clamps 14 engaging the rear axle housing. Extending convergently forward and inward from the forward ends of the elements 10 are the extensions 15 of these elements and extending from the convergent ends of these elements 15 is a supporting element 16 which is preferably tubular. The forward end of the tubular element 16 is longitudinally slotted at 17 and extending into the tubular element is an adjustable supporting member 18 held in adjusted position within the tubular element by a bolt 19 passing into the slot 17. The forward end of the element 18 is provided with a hemispherical socket 20.

Fitting around and between the transmission case and the universal joint housing E is a substantially U-shaped yoke 21 having a bolt 22 whereby it may be clamped in place and having the laterally projecting pivot stub 23.

Projecting downward from the under face of the yoke 21 is a hemispherical boss 24 and a stem 25. The boss 24 rests in the socket 20 and with the socket constitutes a ball joint. The stem extends downward through the element 18 and is provided with a nut at its lower end to hold it in place. The aperture through which the stem 25 passes is large enough to permit a rocking movement of the yoke upon the support 18.

Pivotally engaged with the inside face of each member 10 is an arm 26, the arm being pivoted at 27 to the member 10. Riveted or otherwise attached to the inside face of the arm is a reinforcing element 28 offset from the inner face of the arm at its rear end as at 29 and at its forward end angularly bent inward and forward as at 30 and pivoted to an outwardly projecting lug 31 projecting rearward from the cross brace 11. The pivotal point 32 of this brace 30 is, of course, in alinement with the pivotal point 27 of the arm. These arms 26 carry at their rear ends road engaging members, two forms of which are shown. In Figure 4 I have illustrated a road engaging member which is substantially triangular in shape and designated 33, the apex of this triangular plate being slotted at 34 to engage with the transverse riveted lug 35 and the plate rearward of this slot 34 having a plurality of perforations 36 arranged in an arc relative to the bolt 35 and through which a bolt or pin 37 may pass. These perforations 36 are provided for the purpose of adjusting the element 33 downward as the element 33 wears.

Another form of road engaging element may be used, however, as shown in Figure 6 comprising a sharp edged wheel 38 having a hub 39. Under these circumstances, the members 10 and 30 at their forward ends are channeled as at 40 to receive the hub 39 and protect this hub from dirt and at the same time providing a relatively long bearing for this wheel 38.

For the purpose of raising and depressing the arms 26, I provide a rock shaft 41 which is supported at its ends in bearings 42 carried by the forward ends of the members 10. This rock shaft at its outer ends is provided with the radially extending arms 43. These arms are pivotally connected at their extremities as at 44 to an elongated U-shaped yoke 45.

Pivotally mounted upon the elements 10 adjacent their rear ends are the angular levers 46 pivoted at 47 and at the junction of the two arms of the levers pivoted to links 48 which in turn are pivoted to the arms 26 at 49. The long arms of these levers extend upward and rearward (when my attachment is raised from the road) and the extremities of these long arms are pivoted at 50 to the bifurcated end of a connecting rod 51 which passes through the bight end of the corresponding yoke 45 and passes through a coiled compression spring 52 carried within each yoke. The rear end of each spring 52 bears against the closed end of the corresponding yoke while the forward end of the rod 41 is provided with a nut and washer or equivalent means designated 53 for bearing against the forward end of the corresponding spring 52. A nut 54 is disposed upon the rod 51 to act as a stop. It will be seen, therefore, that when the rock shaft 41 is rotated from the position shown in Figure 1 to the position shown in Figure 5, in a counterclockwise direction, the strain will be exerted upon each yoke 45 and this strain will compress the springs 52 and pull the bell crank levers 46 from the position shown in Figure 1 to that shown in Figure 5, thus depressing the arms 26 and the road engaging elements 33 or 38 but that if while depressed, either of the road engaging elements strikes an obstruction, as for instance a rock, the road engaging element will be forced upward with the corresponding arm 26, forcing the long arm of the lever 46 rearward, thus compressing the spring 52 until the obstruction is passed, whereupon the spring again expands, forcing the road engaging member yieldingly into engagement with the road.

For the purpose of rocking the shaft 31, I provide the radially extending arm 55, this arm being longitudinally slotted at 56. Engaging this arm is the bifurcated rear end of a connecting rod 57 having a pin and roller 58 extending into the slot 56. One side of the bifurcated rear end of the rod 57 is extended and pivotally connected to a link 59 which in turn is pivotally connected at 60 to the base portion of the arm 55 for a purpose to be later stated. The opposite end of the connecting rod 57 is bifurcated at 61 and operating within this bifurcated end is a lever 62 which is longitudinally slotted at 63, a bolt and roller 64 extending through the fork of the forward end of the connecting rod and into this slot 63. A link 65 is pivoted at 66 to the lever 62 above the slot 63 and at its lower end is pivotally connected at 67 to the fork 61. This lever 62 is pivotally mounted upon the stem or stud 23 of the yoke 21 and also pivotally mounted upon the stud 23 is a handle 68 for this lever 62 having a bolt 69 extending through a slot 70 formed in the upper end of the lever. This lever carries a locking pawl or tooth 71 operating over an arcuate rack 72 supported by the clamping yoke 21 so that the lever consisting of the part 62 and its handle 68 may be locked in any adjusted position, the bolt 71 being spring projected and being withdrawable by the bolt operating handle 73 of usual character mounted upon the handle 68.

Preferably the connecting rod 57 is made in two sections engaged with each other by the turn buckle 74 so that this rod may be adjusted and any slack taken up from time to time.

Assuming that the parts are in the position shown in Figure 1 and it be desired to depress the road engaging elements 33 or 38 into engagement with the road, the lever 62—68 is pulled rearward, throwing the lower end of the lever 62 forward. At the beginning of this movement, the lever 62 is connected at its lower end to the connecting rod so that it will exert its greatest force and as the lever 62 swings forward, the link 65 will cause the fork 61 to rise relative to the lever so that at the end of the movement of the lever 62, the point of connection between the connecting rod 57 and the lever will have moved upward nearly to the end of the slot 63. Thus initial rapidity of movement is secured for the rod 57 and connected parts and at the time when the road engaging elements are being forced into the road, power is secured. The same action is secured by the provision of the slotted arm 55. When the lever 62 is rearward and the arms 26 are raised, the point of connection between the connecting rod 57 and the arm 55 will be closely adjacent the pivotal center of the arm, namely the rock shaft 41 but as the lever 62 swings forward and the fork 61 rises toward the pivotal center of this lever, the pivotal connection 58 will move outward on the arm 55 due to the action of the link 59, thus increasing the power or leverage exerted upon the rock shaft 41. The rotating movement of the rock shaft 41 will cause the forward movement of the yokes 45 which will cause the forward movement of the connecting rods 51 and the rocking of the levers 46 upon their pivots 47 to depress the links 48 and thus depress the arms 26 and bring the road engaging members 23 or 38 into engagement with the road.

Either one of these arms 26 may be raised (by the load engaging member striking an obstruction, for instance) without affecting the other arm and its road engaging member. The same is true if the road be uneven, or raised on one side higher than on the other side, one of the road engaging members will be fully depressed and the other be depressed as far as it can be and come in contact with the road.

The braces 13 are highly important as they convey strain or possibly jerk if an obstruction is encountered directly to the place of greater strength and will relieve any possibility of injury to the axle. One of the problems connected with the working out of this mechanism was the relatively long travel of the arms 26 down to the point of engagement with the road and beyond this point of engagement to force the road engaging members into mud, snow or the road bed itself. The lever 62 with its handle 68 could only have a relatively short travel to effect this long travel of the arms 26. With the construction which I have illustrated, I have gained a third more travel or speed and three-fourths more power than is secured by an ordinary system of levers and I have secured this by the provision of the angular levers 46 which secure a quick positive drop of the arms with only a relatively short forward movement or travel. This is further secured by the provision of the slotted arms 55 and 62. Because the connections of these arms to the forks of the connecting rod 57 are movable, I secure one-third greater thrust than is secured by any given or fixed point. By this construction, a short purchase on the hand lever at the last end of the stroke and a relatively great leverage on the member 55 secures very great power in forcing the road engaging elements into the ground.

With this mechanism, a long travel is secured immediately off the lower end of the lever 62 while a short purchase is secured on the arm 55, this occurring at a time when there is no load to handle. As it approaches the loading point, that is, the point of greater strain, the leverage shifts and multiplies, giving the hand lever 62 the short bight and exerting a long leverage at the top of the arm 55. In Figure 1, the position of the parts 48 and 46 is to be particularly noted as in this position, the pivotal points of the parts 46 and 48 are on center so that the weight of the arms 26 will not tend to turn the levers 46 so that the weight on these arms 26 is automatically carried.

I may, however, use in connection with these parts the light springs 75 operatively connected to the rear axle housing and to the pivotal connection of the arms 43 to the yokes 45, these light springs tending to assist in raising the arms 26 out of engagement with the road. It will be seen that this structure when folded up permits the same clearance between the car and the road as does the differential. The method of attaching the structure to the transmission case or to the shaft housing C will, of course, be varied with different makes of cars. When installed, the device cannot be seen when not in use. In actual practice, the disk or sharpened wheel 38 has been found highly satisfactory on mud, ice, etc., as it does not damage the pavement or roadway. The plate 33, however, has been found particularly effective as a road engaging member and particularly as a brake for resisting forward movement of the car or for holding the car from backing down a hill.

This device provides a highly effective means for eliminating side skidding or crawling of the rear end of a motor car, which side skidding or crawling due to the influence of the differential is the cause of many accidents. It will take the place of chains except where chains are necessary for tractive purposes. By its use, a car can be caused to stay up on any road whether the road is unduly crowned or is muddy, icy, or slippery. My structure will permit a car to crawl up out of a ditch. The nuts skid along the bank or side of the ditch as is usual. If while driving along a smooth road in good condition the driver suddenly comes to a bad place, as for instance, a sudden freeze of sleet or rain, the driver ordinarily, rather than put on chains, will take a chance. This device is always at hand and the road engaging members can be depressed until the bad place has been passed over and these road engaging members will hold the car in place on the road under any circumstances. If in going down a steep and slippery hill, the driver can depress the road engaging members and these will hold the car steady and slack the car speed sufficiently for perfectly safe driving without the use of either the emergency brake or the foot brake. With these road engaging members engaged with the road, it is possible to set the brake of the hind wheels solid which would otherwise generally produce accidents.

Of course the device is only intended for emergencies but it will be seen that it may be quickly applied and that it is always at hand ready for application.

Of course, it will be understood that the telescopic connection between the supporting element 16 and the section 18 and the ball and socket joint between the section 18 and the yoke 21 is to allow for the oscillations and relative vibrations between the rear part of the chassis and the forward portion of the chassis and the rise and fall of the chassis relative to the engine and transmission.

Attention is called to certain features of this invention which are important from a practical standpoint. It is pointed out that my strucure is an independent solid unit adapted to be applied to practically all makes of motor cars which is so constructed as to absorb all shock when striking an obstruction, the unit being strongly braced and flexible in every movement and there being nothing but a relatively light weight depending from the rear axle. It will be noted also that the structure is set so far forward that the ground engaging members 33 or 38 will come between the axle and the gas tank and have the same amount of clearance as the differential does. If the device were applied directly under the axle and were formed of a solid hinged arm, it would continuously pound on the axle under strain of meeting obstructions. Furthermore, if the arms supporting the ground engaging members 33 were mounted directly on the axle, they would have the same effect as a wrench and the arm would either itself bend or would tend to bend the axle. With my construction, I provide two ground engaging members, one on each side of the differential, both being equally applied and thus acting to guide the car straight without vibration or strain on the vehicle. My mechanism provides sufficient clearance, it is mechanically practical and secures a powerful and simple application of force to get results. The structure may act as a brake as well as to prevent side skidding and holds the car from running backward. The members 33 it will be noted are reversible, that is, they may be taken off and reversed so that the worn lower end or corner of each member 33 shall be uppermost, leaving the unworn corner downward. Obviously many changes might be made in the details of construction without departing from the spirit of the invention as defined in the appended claims.

I claim:—

1. A stabilizer and brake for motor cars including a supporting frame, rearwardly extending arms pivoted to the supporting frame and carrying road engaging members and means for manually operating said arms including a rock shaft carried by the frame, a manually operable lever carried by the frame, an arm extending from the rock shaft, a connecting rod between the arm and the lever, and means acting automatically as the lever is shifted to depress said road engaging arms, shifting the point of connection between the connecting rod and the lever toward the pivotal center of the lever and simultaneously shifting the point of connection between the connecting rod and the rock shaft arm away from the axis of the rock shaft.

2. A stabilizer and brake for motor cars including a supporting frame, rearwardly extending arms pivoted to the supporting frame and carrying road engaging members, angular levers each pivoted to the supporting frame at the end of one arm of the lever, a link connecting the middle of each angular lever to the corresponding road engaging arm, a rock shaft, radial arms thereon, a connection between each radial arm and the free end of the corresponding lever, and manually operable means for rocking said rock shaft.

3. A stabilizer and brake for motor cars including a supporting frame, rearwardly extending arms pivoted to the supporting frame and carrying road engaging members, angular levers each pivoted to the supporting frame at the end of one arm of the lever, a link connecting the middle of each angular lever to the corresponding road engaging arm, a rock shaft, radial arms thereon, a connection between each radial arm and the free end of the corresponding lever, a manually operable lever, an arm extending from the rock shaft, a connecting rod between the arm and lever, and means acting automatically as the lever is shifted to depress said road engaging arms, shifting the point of connection between the connecting rod and the lever toward the pivotal center of the lever and simultaneously shifting the point of connection between the connecting road and the rock shaft arm away from the axis of the rock shaft.

4. A stabilizer and brake for motor cars including a supporting frame, rearwardly extending arms pivoted to the supporting frame and carrying road engaging members, and means for depressing or raising said arms including a rock shaft operatively connected to the arms, a manually operable longitudinally slotted lever, a longitudinally slotted arm extending radially from the rock shaft, a connecting rod between the arm and the lever and having sliding engagement with said arm and lever through said slots, a link pivoted to the lever adjacent its pivotal axis and pivoted to the extremity of the connecting rod and a link pivoted to the rock shaft arm adjacent its connection to the rock shaft and at its opposite end pivoted to the extremity of the connecting rod, said links acting automatically as the lever is shifted to a position to depress said road engaging arms to shift the point of connection between the connecting rod of the lever toward the pivotal center of the lever and simultaneously shift the point of connection between the connecting rod and the rock shaft away from the axis of the rock shaft.

5. A stabilizer and brake for motor cars including a supporting frame, rearwardly extending arms pivoted to the supporting frame and carrying road engaging members, angular levers each pivoted at one end to the supporting frame, a link connecting the middle of each lever to the road engaging arm, a rock shaft mounted on the frame and having radial arms, rearwardly extending yokes pivotally connected to the arms, compression springs disposed within the yokes, connecting rods each pivotally connected at its rear end to the free end of the corresponding angular lever and each extending through one of said yokes and through the spring and engaging the forward end of the spring, and manually operable means for oscillating said rock shaft.

6. A stabilizer and brake for motor cars including a supporting frame, rearwardly extending arms pivoted to the supporting frame and carrying road engaging members, angular levers each pivoted at one end to the supporting frame, a link connecting the middle of each lever to the road engaging arm, a rock shaft mounted on the frame and having radial arms, rearwardly extending yokes pivotally connected to the arms, compression springs disposed within the yokes, connecting rods each pivotally connected at its rear end to the free end of the corresponding angular lever and each extending through one of said yokes and through the spring and engaging the forward end of the spring, an arm on the rock shaft, a connecting rod having sliding pivotal engagement with the arm at the rear end of the connecting rod, an operating lever pivoted between its ends for rocking movement and below its pivot having sliding pivotal engagement with the forward end of the connecting rod, and means acting automatically as the lever is shifted to depress said road engaging arms shifting the point of connection between the connecting rod and the lever toward the pivotal center of the lever and simultaneously shifting the point of connection between the connecting rod and the rock shaft arm away from the axis of the rock shaft.

7. A stabilizer and brake for motor cars including a supporting frame having means at its rear end whereby it may be connected to the rear axle housing of the car and having a yoke at its forward end adapted to engage the frame of the motor car between the transmission case and the universal joint housing, rearwardly extending road engaging arms pivoted at their forward ends to the frame for movement in a vertical plane, each of said arms having a road engaging member at the rear end, angular levers pivoted upon the frame, each above one of the road engaging arms, a link connecting the middle of each angular lever to the corresponding road engaging arm, a rock shaft mounted on the frame and having radial arms, operative connections between said radial arms and the free ends of said angular levers, an operating lever pivotally supported upon said yoke, means for operating said lever and locking it in any shifted position, a radial arm on the rock shaft, and a connecting rod operatively connecting the arm on the rock shaft with the lever.

8. In a stabilizer and brake for motor cars, a pivoted road engaging arm and manually operable means for raising and lowering said arm, the extremity of the arm being bifurcated and a road engaging member disposed in said bifurcation, the road engaging member being approximately triangular and having a longitudinally extending slot at its forward end and a series of apertures concentric to the slot, there being a bolt passing through the bifurcated end of the arm and through any one of said apertures, the slot engaging a stud in the bifurcation of said arm.

9. In a stabilizer and brake for motor cars, a vertically movable road engaging arm, the rear extremity of the arm being bifurcated, the two walls constituting said fork on their inner faces being longitudinally slotted, a disk having a hub, the hub being disposable in and housed by said slots and a bolt passing through the fork and through the hub of the disk.

10. A stabilizer and brake for motor cars including a supporting frame adapted to be disposed beneath the rear end of a motor car and a tongue extending forward and disposed beneath the shaft housing of the motor car, an element longitudinally shiftable within the forward end of the tongue and having a socket, a U-shaped yoke adapted to fit around between the transmission and universal housing of the motor car and having a ball fitting in said socket and a pin extending through said socket, the yoke having a laterally projecting pivot pin, a lever mounted upon said pivot pin, a lever handle pivotally mounted on the pivot pin, means for locking the lever handle to the lever, means on the lever handle for locking the lever in any desired position, road engaging arms pivoted to the rear end of said frame for movement in a vertical plane, the rear ends of said arms carrying road engaging members, angular levers mounted on the frame and connected by links to said arms, a rock shaft mounted on the frame, and having radial arms, operative connections between said arms and the levers including a compression spring, an arm on the rock shaft, and a connecting rod operatively connected to the arm and operating lever.

11. A stabilizer and brake for motor cars comprising a unitary supporting frame adapted to be applied below the axle of the motor car and extend forward beneath the drive shaft housing and having means whereby it may be connected to the axle and supported upon the transmission case, rearwardly extending arms pivoted to the supporting frame and extending slightly rearward of the rear end thereof and carrying road engaging members, manually operable means carried upon the forward end of the supporting frame whereby said arms may be raised or lowered at their rear ends, and spring means permitting each arm to be raised in passing over an obstruction.

12. A stabilizer and brake for motor cars including a supporting frame adapted to be disposed beneath the axle of a vehicle and extend forward to the transmission case and beneath the drive shaft housing of the vehicle, means for connecting the frame to the rear axle of the vehicle, means for supporting the frame upon the transmission case, arms pivoted at their forward ends to said frame, the rear ends of the arms being disposed approximately below the connections of the frame to the rear axle, the rear ends of the arms carrying road engaging members, levers pivoted upon the frame and having a link connection to the rear ends of the arms, an operating lever mounted upon the transmission case engaging portion of the frame, and operative connections between said lever and the first named levers whereby the arms may be depressed or raised and including springs permitting arms to move upward when striking an obstruction.

MORGAN C. FRENCH.